May 20, 1952 G. N. WILLIS 2,597,831
AUTOMATIC WEIGHING DEVICE FOR THE FEEDBOX OF CARDING MACHINES
Filed March 4, 1947 9 Sheets-Sheet 1

GRANT N. WILLIS,
Inventor
By Robert B. ————, Attorney

May 20, 1952 G. N. WILLIS 2,597,831
AUTOMATIC WEIGHING DEVICE FOR THE FEEDBOX OF CARDING MACHINES
Filed March 4, 1947 9 Sheets-Sheet 2

Inventor
GRANT N. WILLIS,
By Robert B Pearson
Attorney

May 20, 1952        G. N. WILLIS        2,597,831

AUTOMATIC WEIGHING DEVICE FOR THE FEEDBOX OF CARDING MACHINES

Filed March 4, 1947        9 Sheets-Sheet 4

Inventor
GRANT N. WILLIS,
By Robert B. Pearson
Attorney

May 20, 1952  G. N. WILLIS  2,597,831
AUTOMATIC WEIGHING DEVICE FOR THE FEEDBOX OF CARDING MACHINES
Filed March 4, 1947  9 Sheets-Sheet 7

Inventor
GRANT N. WILLIS,
By Roberts B. Larson
Attorney

May 20, 1952     G. N. WILLIS     2,597,831
AUTOMATIC WEIGHING DEVICE FOR THE FEEDBOX OF CARDING MACHINES
Filed March 4, 1947     9 Sheets-Sheet 9

Inventor
GRANT N. WILLIS,
By Roberts B. Larson
Attorney

Patented May 20, 1952

2,597,831

UNITED STATES PATENT OFFICE 2,597,831

AUTOMATIC WEIGHING DEVICE FOR THE FEEDBOX OF CARDING MACHINES

Grant N. Willis, East Bristol, Conn., assignor to Arthur G. Russell Company, Incorporated, Forestville, Conn., a corporation of Connecticut Application March 4, 1947, Serial No. 732,323

9 Claims. (Cl. 249—4)

1

This invention relates to material handling apparatus, and more specifically to an apparatus for automatically controlling the delivery of light textile fibers as, for example, wool received from a source of supply.

One of the objects of this invention is to provide apparatus for moving fibrous material wherein the feeding mechanism is controlled by a weighing device which automatically corrects for variations of materials delivered to the feed pan, as compared to a predetermined set value or norm.

Another object of this invention is to provide automatic weighing means for obtaining, in textile-manufacturing equipment, uniform average weighings from the feed box to the carding machine.

Still another object of this invention is to provide an automatic weighing device which will eliminate dependence upon constant manual efforts to maintain the fibrous material hopper level at a constant in order to assure constant weights of materials for discharge from the weighing pan.

Another object of this invention is to provide an automatic weighing device for textile fibers having means for operating a feed shutoff, or an alarm in the event the feed box hopper is emptied, or if the weights delivered to the weigh pan vary more than a predetermined amount.

It is a further object of this invention to provide a weighing device for textile fibers automatically controlling the exact number of pounds of fibrous material which is to be delivered from the feed box to the carding machine, thereby eliminating the necessity for sampling several lengths of roving in order to arrive at the correct tare weight for the proper roving weight.

A further object of this invention is to provide an electronic weighing system which automatically compensates, on succeeding weighing operations, for departures from a predetermined standard.

Other and further objects of this invention will become apparent from a consideration of the following specification when read in the light of the accompanying drawings in which:

Figure 3 is a plan view of a conventional textile

2 feed box equipped with a weigh pan control mechanism in accordance with this invention.

The instant invention relates to devices designed, specifically, to correct the inaccuracy of the present textile carding feeds, and while the mechanism shown and described herein comprises an attachment for the conventional feed box, the device may be incorporated with the feed box machine as a permanent unit.

The basic concept of this invention resides in the provision of a device of the type described which, during a plurality of successive weighing operations, will determine the amount that each load in the weigh pan of the feed box is over or under weight, as measured by the neutral position of the scale beam, and then to apply a corresponding compensating correction to the next load. This has the effect of eliminating entirely the downward trend in delivery weights usually caused by the decreasing amount of stock in the supply hopper, and it also serves to smooth out the peaks between loads normally found in conventional machines.

It has been determined that one of the main causes of inaccuracies in automatic weighing machines, heretofore known in the art, has been due to the fact that there is always an over-run of stock after the scale arm has been tripped. This over-run is always present regardless of the sensitivity of the scale mechanism employed, and since the weight of the overrun is not a constant, the result is a variation in the delivered weight. This is particularly true in textile weights, where the delivery of fibrous material into the weigh pan in effected by means of a spike apron which picks up stock from a hopper. In view of the fact that the amount of the stock on the apron of the feed box is greatly affected by the amount of stock in the hopper of the feed box, the result, obtained by conventional automatic weighing means, is a high degree of variation in the rate of delivery of stock into the weigh pan. This, in turn, means that the weight of the overrun is also a variable depending largely on the amount of stock in the hopper. The delivered weight thus usually shows a steady decrease as the hopper runs low, resulting in the corresponding downward trend in the weight of the roving delivered by the carding machine. Many tests have been made, all of which show this trend to exist, even with the most modern feeds.

The electronic mechanism forming the subject matter of this invention is so effective in producing even and correct weights, that when installed on any operable textile card feed, it will produce more even and correct weighings than will new feeds not provided with such control apparatus. With equipment according to the present invention, average weights per dump have consistently been measured to be accurate to less than one percent from full to empty hopper. Such apparatus has the further advantage in the weights delivered will correspond exactly to the weighing of the scale beam, thus permitting the feed to be set in advance for the desired weight.

The instant control for textile feeds may be installed on any feed, regardless of its age or condition, and the installation of such equipment may be made in a very short time.

The "correcting assembly" is secured to one side of the feed and is connected to the scale beam, while the "control mechanism" may be mounted on either side of the feed or may be situated in any convenient remote location.

This invention relates to feed box control apparatus especially adapted for use in conjunction with the conventional feed box for a carding machine. The feed box consists essentially of a hopper in which the stock is initially fed, a vertical spike apron whose function is to carry a supply of stock from the hopper to the weigh pan, a comb whose function is to remove excess stock from the spike apron, and a second comb whose function is to remove the stock from the spike apron into the weigh pan. The weigh pan assembly is mounted on pivots, and means are provided to stop the motion of the spike apron when the weigh pan has received a sufficient weight of stock, thus preventing further feeding of stock into the weigh pan. Means are also provided to empty the weigh pan onto a conveyor after a predetermined length of time, and also to close the weigh pan and to re-start the weighing cycle.

It should be noted that one way of starting and stopping the supply of stock into the weigh pan is to use an electric motor drive on the spike apron which is controlled by a mercury switch responsive to the position of the weigh arm. Another method is to engage and disengage a mechanical clutch on spike apron drive, the clutch also being responsive to the position of the weigh arm, either through a direct mechanical linkage or through the action of a mercury switch energizing a solenoid attached to the mechanical clutch.

The cycle of operation with the control functioning is briefly as follows:

The stock is fed into the weigh pan in the usual manner. When the pre-set weight has been received, the weigh pan scale arm moves upward and closes a contact. This stops the spike apron drive and prevents further delivery of stock to the weigh pan. As has been noted, there is always an overrun of stock into the weigh pan due to the stock which was falling at the instant the weigh pan balanced, the inertia of the spike apron drive, and the time required to actuate the spike apron drive control. The amount of overrun is a variable, and is a source of error on conventional feeds. One purpose of this control is to detect the amount of overrun and to correct its effect.

The control mechanism then introduces direct current into a balance coil connected with the weigh arm in a direction such as to cause a pull downward on the weigh arm. The pull is caused by the fact that the field generated by the coil opposes the field of a suitably located permanent magnet. The voltage across the coil is increased until sufficient force has been generated to pull the weigh arm down and open the contact. The value of the force required is thus a measure of the weight of excess stock in the weigh pan.

When the next weighing cycle starts, the control mechanism introduces the same value of direct current into the coil, but in the opposite direction. Thus, if the previous weighing has been 50 grams too heavy, the coil acts to provide an equal counterbalancing force upward on the weigh arm. This gives the same effect as though a 50 gram weight had been placed in the weigh pan before the weighing cycle started. This results in a weight of stock during the instant weighing operation which is lighter by the same amount that the previous weighing was heavy (which is the amount of the previous overrun). The control then removes the force, and re-examines the balance obtained. If the overrun on the second weighing is exactly equal to that of the first weighing, the weigh arm will balance at its mid point upon removal of the coil force and no further correction is made. However, if the overrun of the second load is greater than that of the first load, a further correction will be added to the first in the same direction. On the other hand, if the overrun on the second load was less than the first, the second correction will be subtracted from the first.

The control mechanism can also be used to effect a further beneficial evening of the weight of the finished yarn. In the usual arrangement of a carding machine, the feed box supplies stock into the carding machine through nip (feed) rolls which are turning at constant speed. That is, the weigh pan drops stock onto a conveyor which is driven at constant speed from the carding machine. The pile of stock dropped by the weigh pan is pushed forward by a "pusher board" also operated at constant speed by a drive from the carding machine. The pusher board serves to compress the pile of stock from the weigh pan forward on the conveyor so that it forms a batt or thick blanket of stock with previous weighings. The batt is then fed through nip rolls into the carding machine. It should be noted that the pusher board, in the conventional arrangement, pushes the stock forward the same distance on each stroke, also that the nip rolls rotate at constant speed. This means that variations in the thickness of the batt or in the density of the batt cause instantaneous corresponding changes in the weight of roving emerging from the output end of the carding machine. In other words, even though the weight of stock fed into the carding machine over a period of time were a constant, the instantaneous rate is a variable. This results in thick and thin places in the roving when examined in small increments (as one-half inch) even though the weight of long increments (as 100 yards) might be uniform. This effect is serious because it results in uneven yarn which gives a rough effect when woven into cloth. When the roving is spun into yarn, the twist will run more into the thin places because there is less resistance to the twist. The effect is a pebbly or uneven cloth.

This effect has been known in the trade and instruments have been perfected which will indicate the instantaneous variation in the weight of roving coming from the card. This knowledge has not been of great practical value, however, as a means of producing consistently uniform roving because the roving is already formed before it can be measured. It is then too late to do anything about correcting the instantaneous weight variation.

Summarizing the performance of the conventional feed, there are two basic weaknesses which result in non-uniform roving. The first of these—as previously described—is that the weigh pan actually delivers a decreasing weight of stock as the amount of stock supply in the hopper decreases. This is due primarily because the rate of feed from the hopper decreases as the supply is exhausted, causing the weight of the overrun to decrease proportionally. The result is a downward average trend in the weight of stock delivered by the weigh pan, and a corresponding trend in the weight of the roving produced by the carding machine. The second weakness is that inadequate provision is made to deliver a constantly uniform weight of wool (or other stock) into the carding machine considering small increments of time. This is due to the uneven formation of the batt which is fed into the carding machine. Since the nip rolls turn at constant speed, it follows that a batt of constant density must be formed on the conveyor in order to feed a uniform weight of stock each instant. With the mechanism taught by this invention these weaknesses are overcome to a very high degree.

Figures 10, 11, 12, 13:
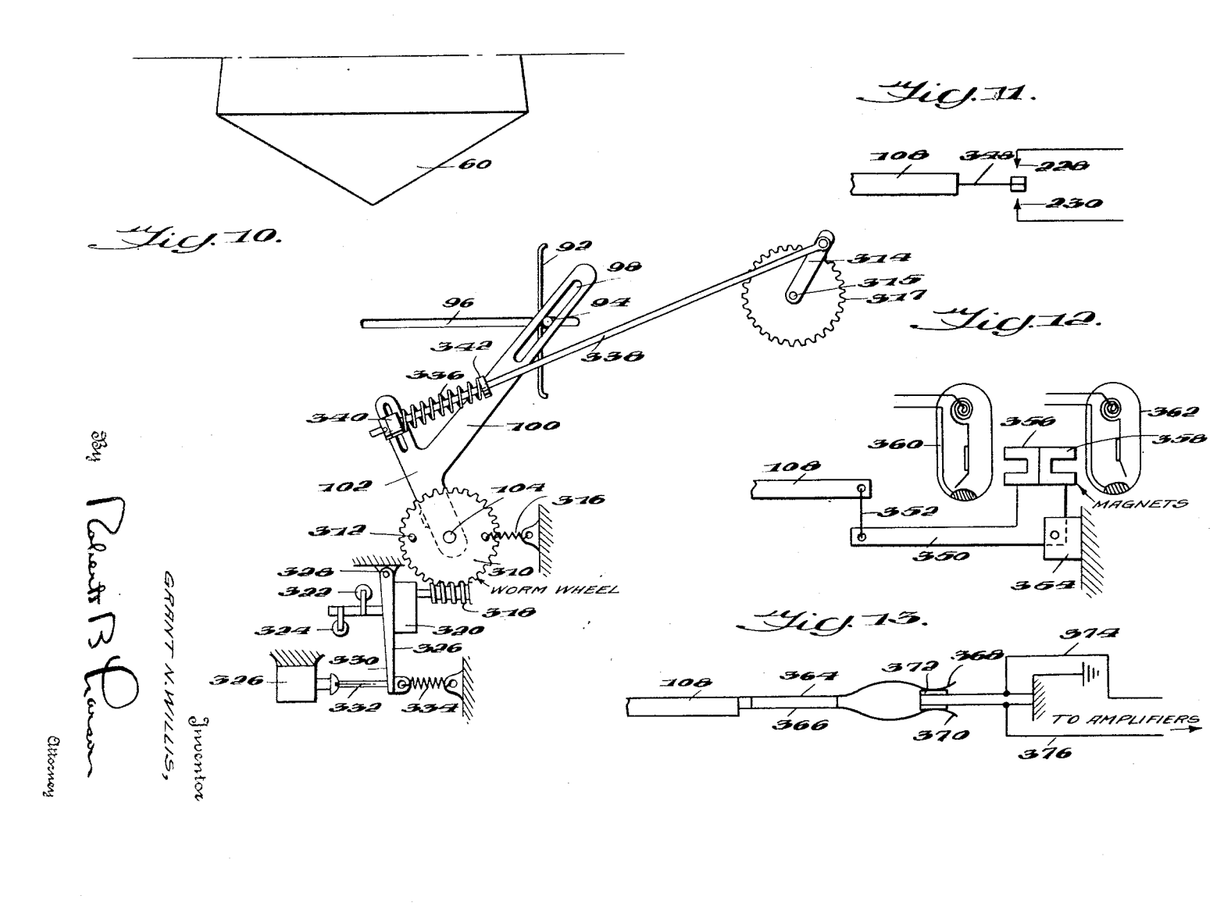
Figure 10 is a schematic diagram of one method for controlling the pusher board to compensate for weight variations.
Figure 11 is a diagrammatic illustration showing one alternate method for indicating to the control mechanism the position of the weigh arm.
Figure 12 is a schematic illustration of a further method for indicating to the control mechanism the position of the weigh arm.
Figure 13 is another method for indicating to the control mechanism the position of the weigh arm.

The instantaneous variation can be corrected by the control mechanism because the amount of weight variation in each operation of the weigh pan is known in advance while there is still opportunity to correct the effect. One method to accomplish this would be to vary the stroke of the pusher board, in accordance with the individual weighings, so that the volume occupied by each weighing on the conveyor would be in proportion to the actual weight of the particular weighing. This would insure uniform density of the batt of stock on the conveyor. A mechanism to accomplish this end is shown in Figure 10. Another method of accomplishing this effect would be to vary the speed of the nip rolls to compensate for the weight variation of each weighing by changing the speed of the rolls in proportion. This would require a variable speed drive on the nip rolls, such as a Thymotrol, with a suitable time delay so that the speed of the nip rolls changed as each weighing arrived at the nip rolls. This method would require considerably more equipment than the pusher board method, and hence is not shown in detail.

Figure 1:
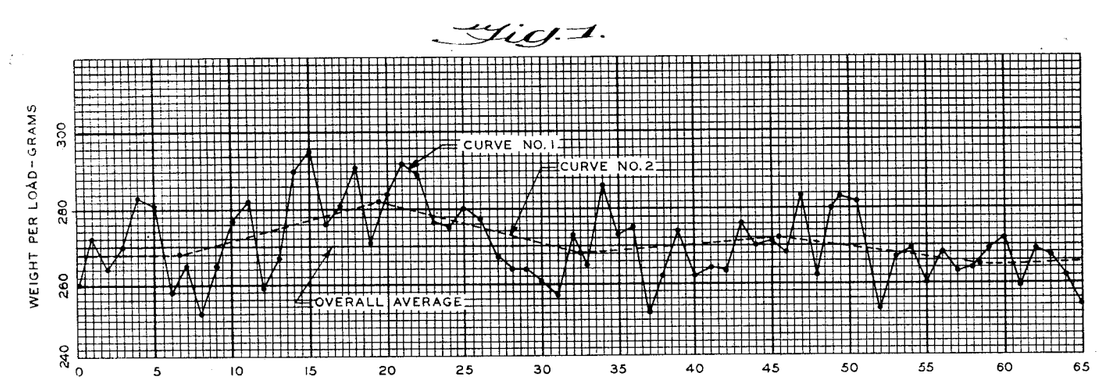
Figure 1 graphically illustrates the weight variations from a predetermined average weight obtained from tests on conventional equipment, including the conventional weight control mechanism.
Figure 2:
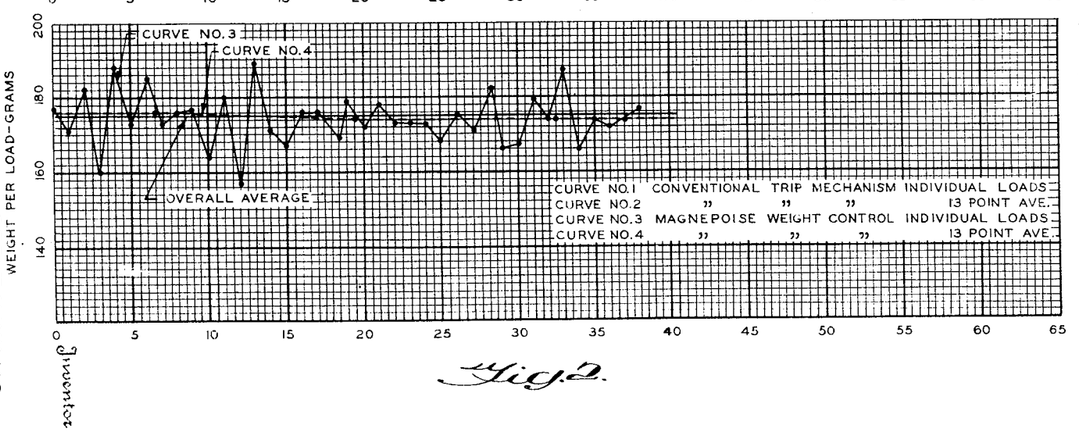
Figure 2 graphically illustrates the weight variations from a predetermined average weight obtained on equipment utilizing the weight control device according to this invention.
Figure 3:
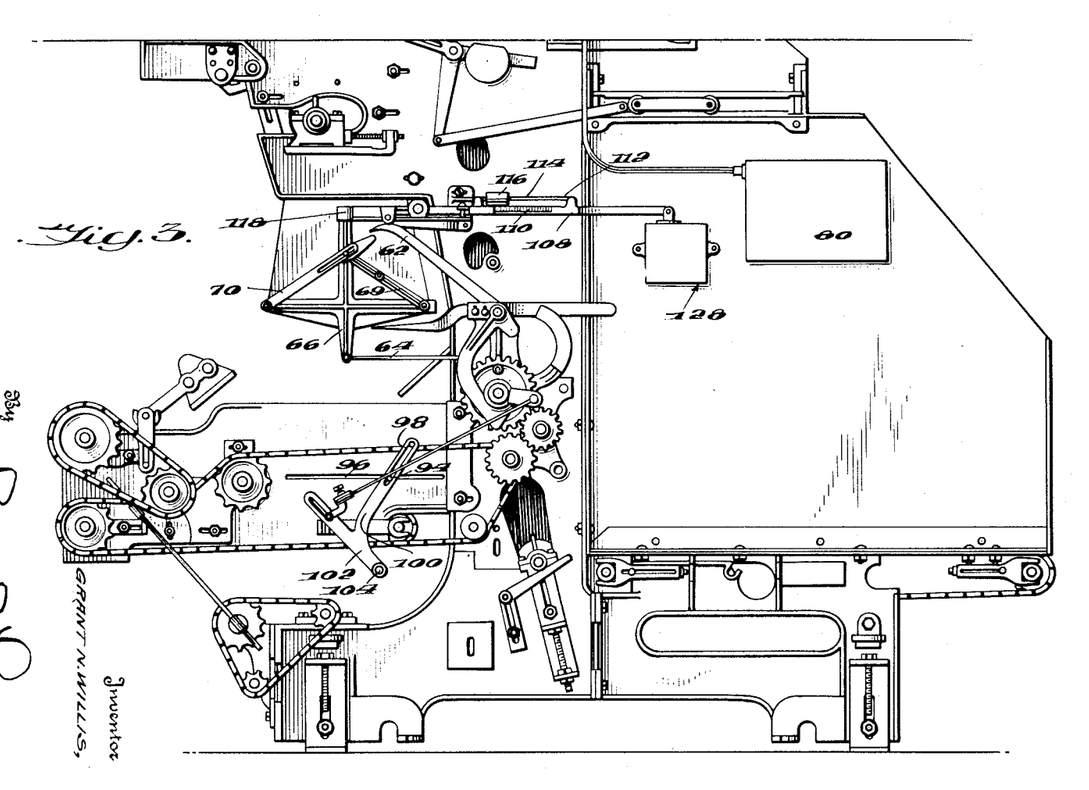
Figure 4:
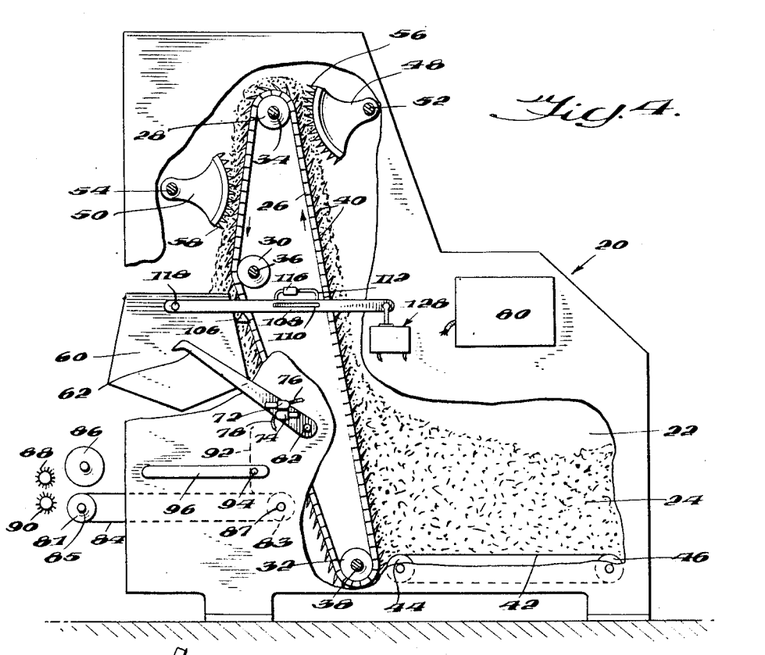
Figure 4 is a side elevation of the device shown in Figure 3, portions thereof being broken away to disclose, diagrammatically, the various elements with which this invention is concerned.

Referring now specifically to Figures 3 and 4 of the drawings the reference numeral 20 indicates in general a conventional feed box for a carding machine. These figures also indicate the relative position of the control mechanism, to which this invention relates, with respect to the usual feed box parts.

The conventional feed box 20 consists essentially of a hopper 22 to which the stock 24 is initially fed. A substantially vertical spike apron 26 of the endless conveyor type is positioned within the feed box 20, the apron being supported on and guided by the spaced pulleys 28, 30 and 32, which, in turn, are secured to their respective pulley shafts 34, 36 and 38, the shafts being suitably journalled in the side walls of the feed box 20.

Any driving means known in the art may be employed for driving the spike apron 26.

As seen in Figure 4, the spike apron is provided with a plurality of spikes 40 which extend transversely of the belt. The lower end of the spike apron 26 is positioned adjacent one end of the horizontal conveyor apron 42 carried by pulleys 44 and 46 which are supported on the feed box according to convention. The horizontal apron 42 is disposed proximate the base of the hopper 22 and beneath the stock placed therein.

A pair of combs 48, 50 are pivotally mounted on shafts 52, 54, respectively, for oscillation about their axes of rotation, and are provided with teeth 56, 58. The comb 48 functions to remove the excess stock from the ascending side of the spike apron 26, the stock so removed falling back into the hopper, and the comb 50 serves to remove the stock from the spike apron 26 on its descending side, the stock falling into the weigh pan 60.

The weigh pan is provided with a trip arm 62 and is connected with kinematic means 64, 66, 69 and 70 (Figure 3) whereby operation of the trip arm 62 in one direction opens the weigh pan 60 and activation in the other direction closes it. Since these means form no part of this invention and are conventional, only brief mention thereof is made.

Figure 5:
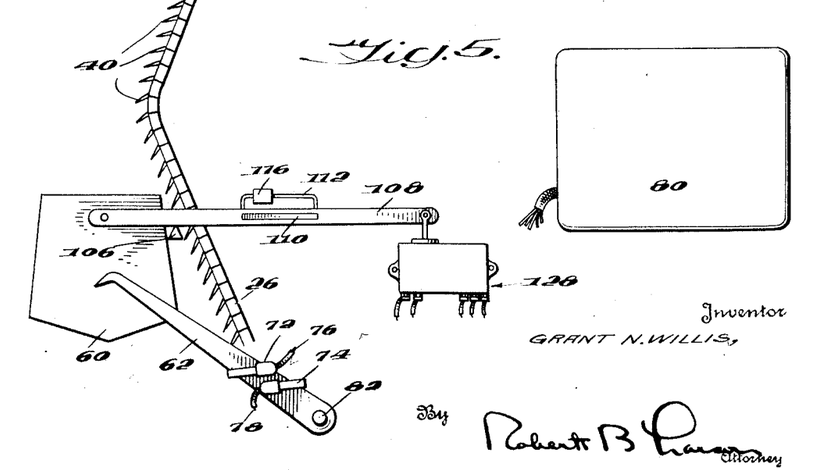
Figure 5 is an enlarged diagrammatic representation of the magnet and coil assembly and the weight control and connecting mechanism shown in Figure 4.

The trip arm 62 supports a pair of mercury switches 72 and 74 which are connected by leads 76 and 78, respectively, to a control mechanism 80, the control mechanism to be described in detail below. The switches 72, 74, are so mounted on the arm 62 as to permit switches 72 to open and the switch 74 to close as a trip arm is actuated downwardly to empty the weigh pan 60. The rotation of the trip arm 62 on shaft 82 upwardly, in the position shown in Figures 3, 4 and 5, closes switch 72 and opens switch 74.

A conveyor 84 is disposed immediately below the weigh pan 60 to receive the stock discharged therefrom. The conveyor is suitably mounted on rollers 81, 83 whose shafts 85, 87 are mounted on the feed box 20. The conveyor 84 carries the stock to the feed roll 86 and adjacent this point the stock is delivered to the nip rolls 88 and 90.

Reference is now made to Figures 3, 4 and 10 wherein it is seen that a pusher board 92 is slidably mounted on the frame of the feed box 20, the pusher board having a pair of oppositely disposed lugs 94 (only one being shown) which ride in the oppositely disposed and aligned guide slots 96. One of the lugs 94 (see Figure 10) is engaged within an elongated slot 98 formed in arm 100 of the bell crank lever 102. It is seen that as the lever 102 is rocked about the shaft 104 on which it is mounted, pusher board 92 will reciprocate horizontally above the conveyor 84 to force the stock toward and in the direction of the nip rolls 88, 90. Conventional means for operating the bell crank lever 102 are provided, and hence, requires no elaboration.

Weighing mechanism is provided comprising a fixed fulcrum 106 which cooperates with a weigh arm 108. A weight scale 110 is permanently secured to the side of the weigh arm 108, the arm also having secured to the upper edge thereof, and immediately above the scale 110, an inverted U-shaped member 112, the base portion 114 of which is externally threaded to cooperate with the weight adjusting member 116 provided with internal complementary threads. One end of the weigh arm 108 is connected at 118 with the weigh pan 60, while the other end thereof is pivotally connected with (Figure 6) arms 122 by pin 120 of a U-shaped yoke 126 the latter comprising an element of the weight control mechanism indicated generally by the reference numeral 128.

Figure 6:
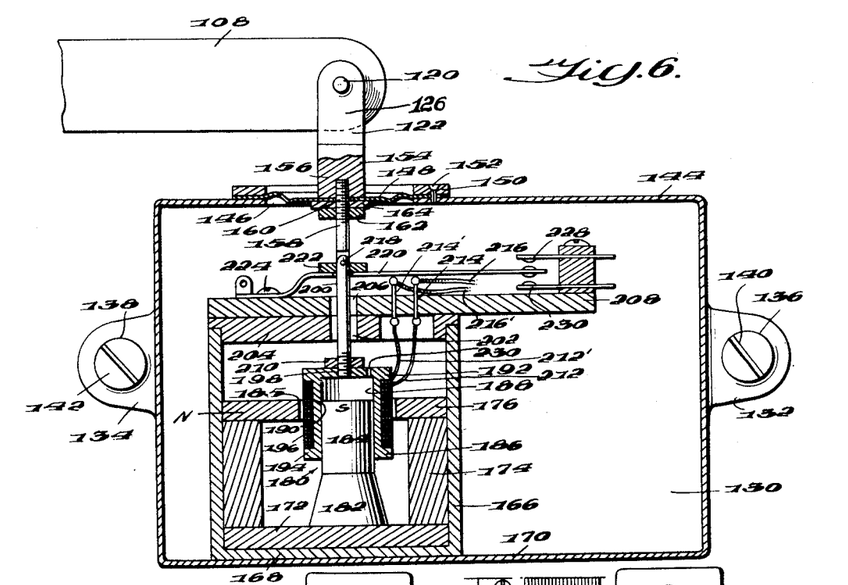
Figure 6 is a cross section of the magnet assembly 128.

The weight control mechanism is enclosed in a dust-proof container 130 having laterally projecting lugs 132 and 134 fixedly mounted on each of its respective ends. As shown in Figure 6, the lugs 132 and 134 are apertured at 136, 138, to receive bolts 140 and 142 for mounting the assembly 128 to the side of the feed box 20.

The container 130 is provided with a top wall 144 in which is formed, adjacent one end thereof, an aperture 146 substantially circular in configuration. A diaphragm 148 extends across the mouth of the aperture and is secured against the exterior surface of the wall 144 by an annular dust seal member 150 fixed to the wall 144 by a plurality of screws 152 which are spaced around its periphery.

The base 154 of the yoke 126 is internally threaded at 156 to receive one end of an exteriorly threaded shaft 158 which projects through an aperture 160 formed coaxially with the diaphragm 148. The shaft 158 is releasably secured to the yoke 126 by means of a lock nut 162 and washer 164, the lock nut and washer cooperating with the base 154 of the yoke 126, to seal the aperture 160 against dust leakage.

The dust-proof casing 130 encloses a non-magnetic cylindrical housing 166 having a base portion 168 which is supported and fixedly mounted on the lower wall 170 of the casing 130. An iron disc 172 is superposed on the end wall 168 and supports a ring-type magnet 174. The magnet 174 has mounted thereon an annular iron ring 176 which becomes the north pole of the magnet assembly. An iron center pole 180 is coaxially mounted on the iron plate 172, and is substantially circular in cross section. The center pole 180 is provided with an enlarged tapering end portion 182, while the upper end portion 184 projects through the circular aperture 185 in iron ring 176 and is of opposite polarity. A non-magnetic circular metal coil form 186 is cored at 188 to provide a sliding fit with the circular end portion 184 of the outer pole 180. The form 186 is recessed at 190 to form, at opposite ends of the recessed portion, the shoulders 192, 194. A wire coil 196 is wound in the recessed portion 190 and extends between the shoulders 192, 194. The coil form is provided with a threaded aperture 198 which receives the threaded end of a vertically positioned rod 200 which extends through an aperture 202 provided in the closure plate 204 and a coaxially disposed aperture 206 formed in a Bakelite base 208 on which is mounted a switch contact assembly to be described in detail below.

A lock nut 210 releasably secures the rod 200 to the coil form 186.

Leads 212, 212' extend from the coil 196 upwardly to connecting pins 214 and 214' mounted in the base 208. Lines 216 and 216' are connected at one of their ends with elements 214, 214', while the other ends thereof are connected to the weight control mechanism which is to be described.

One of the ends of a resilient switch member 220 is fixedly secured to the Bakelite base 208 by bolt 224 and is provided with an insulating washer 222 while the other of its ends 226 is free to oscillate and to engage with contact switch points 228 and 230. The pivot pin 218 connects the lower end of rod 158 with the upper end of rod 200 and extends beyond the periphery of the rod 220 and is so positioned as to bear against the washer 222 upon downward movement of rod 220.

The magnet and coil assembly is oil filled whereby the center pole magnet 180 acts as a piston in the coil form 186 thus introducing damping into the system. The amount of damping can be controlled by proper choice of the viscosity of the oil used and the size of the orifice 230 formed in the coil form. The damping is necessary in order to prevent a premature closing of switch arm 220 with contact 228 as the weigh pan fills with stock due to vibration and to the kinetic energy of bunches of stock falling into the weigh pan.

It will be seen at this point that should electric current be passed through the coil 196 in one direction it will cause an upward force on the coil, while current in the opposite direction will exert a downward force. The magnitude of this force is approximately proportional to the magnitude of the current through the coil.

Figure 7:
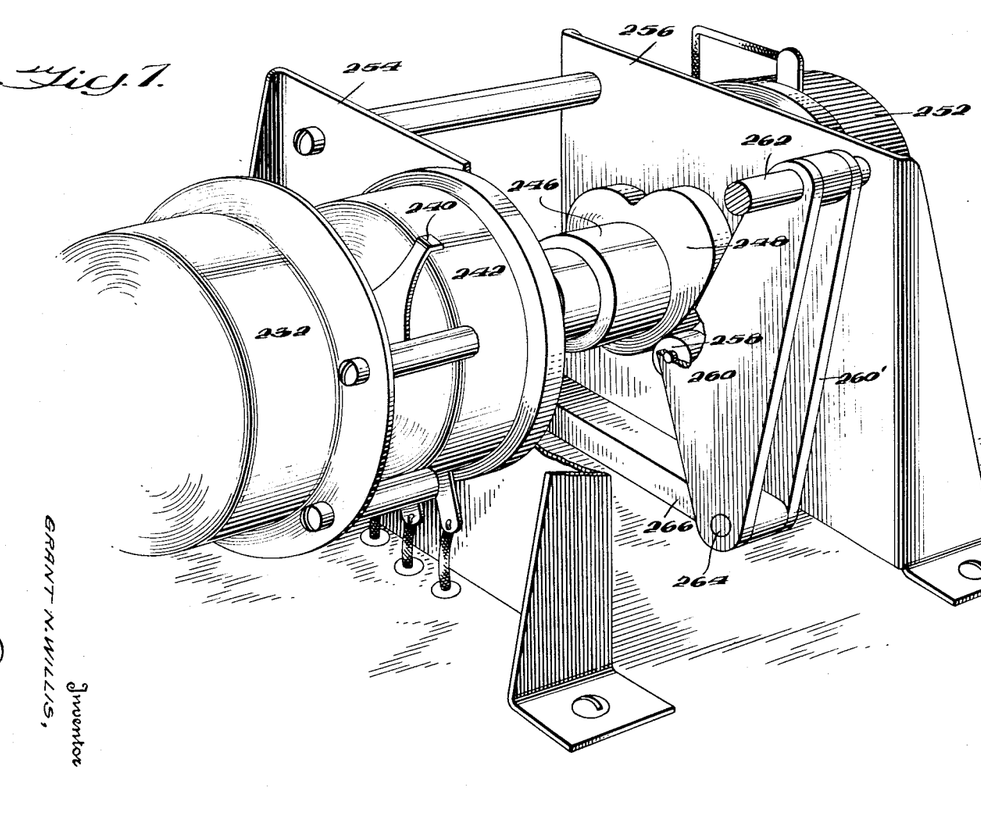
Figure 7 is a perspective view, partly cut away, of the weight control correcting assembly.
Figure 8:
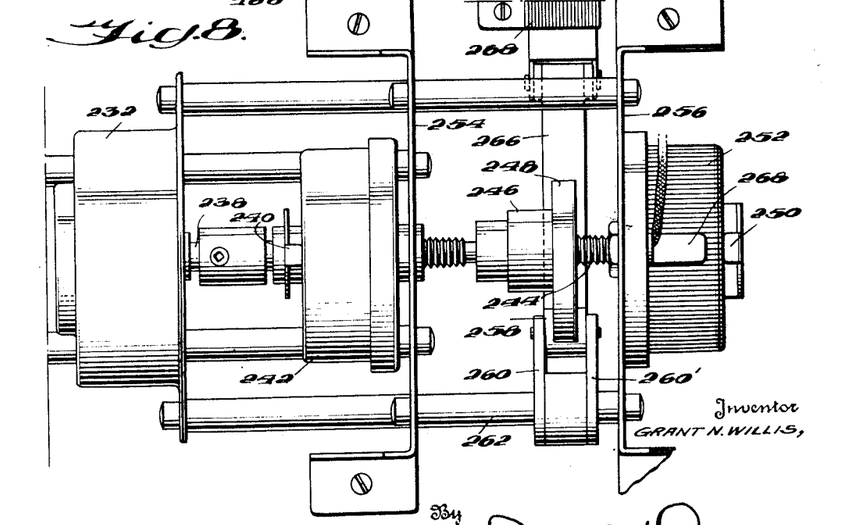
Figure 8 is a top plan view of the mechanism shown in Figure 7.
Figure 9:
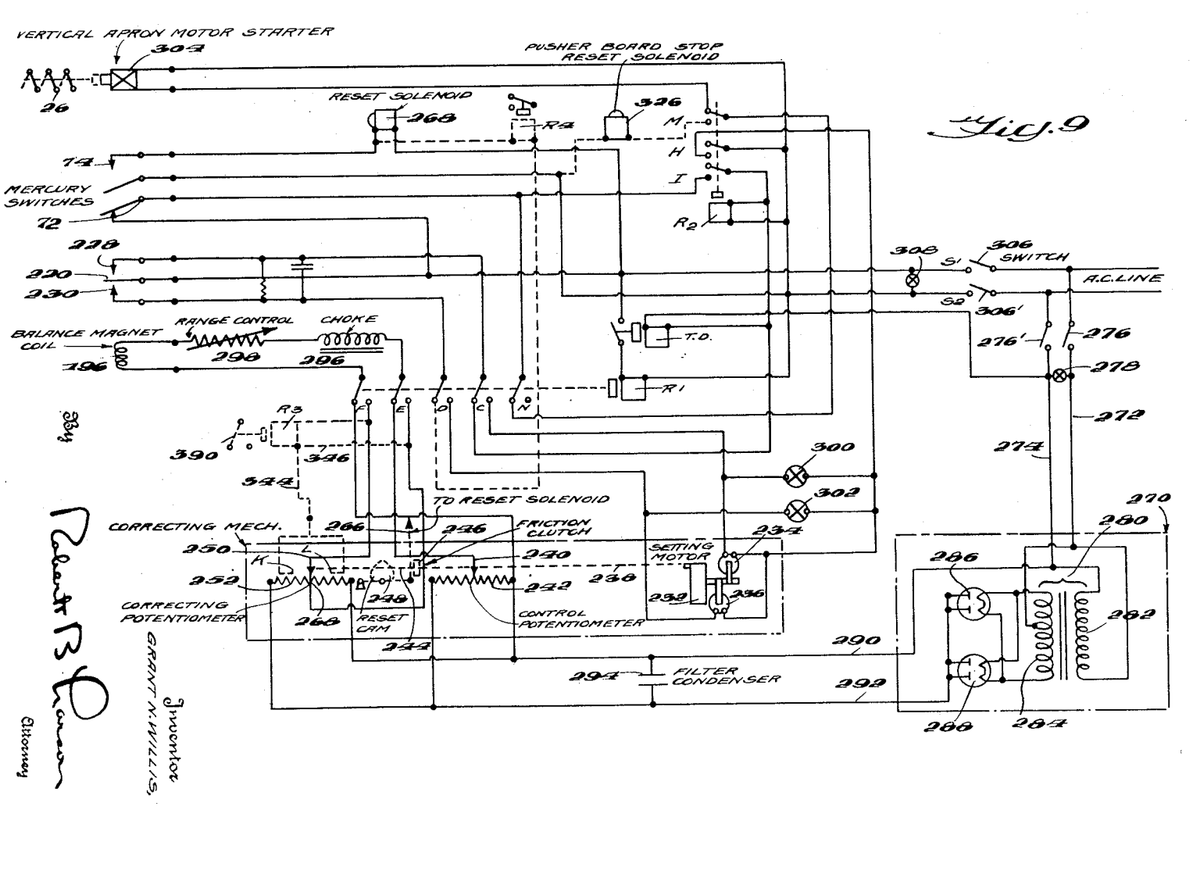
Figure 9 is a circuit diagram of the weight control mechanism.

Reference is now made to Figures 7, 8 and 9 which disclose the weight control and correcting mechanism assembly and the wiring diagram therefor. The correcting and control mechanism comprises a setting motor 232 provided with reversing coils 234, 236. The setting motor drives shaft 238 on which is mounted slider 240 of a control potentiometer 242. A shaft 244 is connected with shaft 238 through a friction clutch 246. The shaft 244 has mounted thereon a reset cam 248 and the slider 250 of a correcting potentiometer 252.

As seen in Figures 7 and 8, a suitable framework comprising the spaced uprights 254, 256 support a cam follower 258 which is rotatably mounted on a pair of parallel spaced plates 260, 260'. The spaced plates are pivotally supported adjacent their upper ends on a spacer bar 262 while the lower ends of the plates are connected by pin 264 on which is pivotally supported one end of an armature 266 of a reset solenoid 268. The correcting potentiometer is provided with a center tap 268, the nature and function of which will be described.

Referring specifically to the circuit diagram shown in Figure 9, it is to be noted that the motor 232 is directly connected to the control potentiometer 242 which in turn drives the correcting potentiometer 252 through the friction clutch 246. The friction clutch is capable of delivering ample torque to turn the correcting potentiometer slider 250, but will allow the correcting potentiometer slider 250 to be reset to its mid position by means of the heart-shaped cam 248, without turning the control potentiometer slider 240 and the motor 232.

It will also be seen that this unit is comprised of a half wave rectifier 270 energized from an indicated source of alternating current by lead lines 272, 274. A line switch 276, 276' is provided to control the current to the rectifier and a signal lamp 278 is connected across lines 272, 274 to indicate the passage of current. Lines 272, 274 are connected with the primary winding 282 of a transformer 280 and the secondary winding 284 is connected with a pair of rectifier tubes 286, 288 to supply a constant source of D. C. to lines 290, 292. This voltage is connected permanently across the control potentiometer 242 and the correcting potentiometer 252. The potentiometers 242 and 252 are similar and linear and therefore the voltage to the sliders 240, 250, of either of the potentiometers will increase or decrease by the same amount per degree of rotation. It will be noted that the correcting potentiometer 252 is center tapped at 268 so that either a positive or negative voltage can be obtained across the relay contacts E and F of the relay $R_1$, depending on which side of the center tap the slider 250 is moved. The control potentiometer 242 is so connected that the polarity of the voltage to the slider 240 is always in the same direction, and can be varied from zero to full voltage of the power supply, depending upon the position of the slider. The usual filter condenser 294 is connected across the output lines 290, 292 of power pack 270.

A choke 296 is connected in series with the balance magnet coil 196, the choke serving to smooth out the voltage delivered to the coil by the half-wave rectifier device described above. A range control 298 consisting of a variable rheostat is also provided in series with the choke 296 and the coil 198 to provide means for adjusting the range of forces within which the balance magnet 180 is to operate. The balance coil 196 is connected to either the control potentiometer 242 or to the correcting potentiometer 252, depending upon the position of the contacts E and F of the relay $R_1$.

The reversing type setting motor 232 is connected so that when the relay $R_1$ is operated, contacts 228 or 230 will be closed by the member 220 to actuate the motor 232 either in clockwise or counter-clockwise direction, depending on which of the contacts 228, 230, is closed. As will be seen from Figure 9, the motor windings 234, 236 are provided with lamps 300 and 302 connected in parallel therewith in order to indicate the direction the motor is running.

The mercury switches 74 and 72, are affixed to the weigh pan trip arm 62, as described above, in such a way that the contact 74 is open, and the contact 72 is closed, when the weigh pan 24 is closed. Whenever the trip arm operates, contact 72 opens and contact 74 closes. Contact 74 when closed, energizes the reset solenoid 268, thereby actuating the armature 266 to cause the cam follower 258 to engage against the reset cam 248 in order to reset the correcting potentiometer 252 to its zero voltage position as shown in the circuit diagram. Contact 72 is connected in series with the lock-in circuit of the relay $R_2$ thus the relay $R_2$ is released whenever contact 72 opens. It should be noted that the contacts 72, N and M must all be in the position shown in Figure 9 in order to energize the motor starter 304 connected with the vertical apron motor (not shown). Switch 306, 306' is provided so that the feed box can be operated in the conventional manner without the weight control section of the mechanism in operation. The indicating lamp 308 is connected across the main alternating current line in order to indicate that that circuit is energized. As noted before switch 276, 276' supplies A. C. power to the rectifier 270 and also to a time delay relay TD. Both switches 276, 276' and 306, 306' must be closed for the entire system to operate.

Relay $R_1$ is a five-contact double-throw relay. Relay $R_2$ is a three-contact double-throw relay. Relay TD is a normally open single-pole single-throw mercury time delay relay. In operation, let it be assumed that switches 276, 276' and 306, 306' are closed and that both potentiometers, 242, 252, are set to their zero voltage position in the beginning of the first weighing cycle. Relays $R_1$, $R_2$ and TD are in their non-operated position as shown. Contact 230 is closed and contact 228 is open, since the weigh pan is not yet filled. Contact 72 is closed and contact 74 is open, since the weigh pan trip arm 62 is in the up position and the weigh pan doors are closed. The balance coil 196 is applying no force to the weigh arm 108 since the control potentiometer 242 is in its no-voltage position. The reset cam 266 is free to turn since the reset solenoid 268 is not energized.

Since the vertical apron motor starter 304 is energized from switch point $S_1$, through contacts 72, N, and M to $S_2$, the vertical apron 26 is running and stock is being delivered to the weigh pan 24. When the weigh pan receives sufficient weight of stock to operate the weigh arm 108, the weigh arm moves upward closing contact 228 and stopping the vertical apron 26. (Note that at this moment there is still some stock which has left the apron 26 and is falling onto the weigh pan 24.) When the contact 228 closes, relay $R_2$ is energized from $S_1$ through contacts 228 and C to $S_2$. The time delay relay TD is also energized through the same path, but does not close immediately since it is as described above, a slow reacting relay. When relay $R_2$ pulls in, contact M opens deenergizing the motor starter 304 to stop the vertical apron 26. Contact I closes, locking the relay $R_2$ and the time delay relay TD from contact $S_1$ through the contacts 72 and I to $S_2$. Contact H connects the common side of the setting motor 232 to the contact $S_2$. After the pull-in time of the time delay relay TD has lapsed, the relay closes energizing the relay $R_1$ and operating contacts C, D, E, F, and N. Contact N is opened making it impossible for the vertical apron to start until the relay $R_1$ is de-energized. Contacts C and D connect contacts 228 and 230 to the motor coils 234, 236. Contacts E and F connect the balance magnet coil 196 to the correcting potentiometer 252. Since the first weigh pan load is heavy due to the overrun, contact 228 remains closed. This causes the setting motor 232 to run in a direction such that the potentiometer sliders 240, 250 move to the left (as viewed in Figure 9). This increases the current through the balance coil 196 so as to apply a downward force on the end of the weigh arm 108. The downward force is increased until the overrun in the weigh pan 24 is balanced and contact 228 is opened, thereby stopping the motor. It should be noted that the output voltage of the control potentiometer 242 at this time is equal to the output voltage of the correcting potentiometer 252. This voltage is a measure of the overrun of the first load. The weigh arm 108 now remains in a neutral position so that contacts 228 and 230 are both open until the trip arm 62 is actuated by the carding machine.

As the trip arm 62 is actuated to empty the weigh pan 24, contact 72 opens and contact 74 closes. When contact 72 opens, relay $R_1$ is deenergized because contact 72 is in series with its lock-in circuit. The time delay relay TD is also de-energized for the same reason, its contact does not open immediately due to the characteristics of the relay. When relay $R_2$ opens, contacts M, H and I change back to the position shown in the Figure 9. Contact I is opened so that relay $R_2$ will not be re-energized when the contact 72 closes again. Contact H opens the common line to the setting motor 232 so that any closure of contacts 228 or 230 due to disturbance of the weigh arm 108 caused by tripping the weigh pan 24 will not cause the setting motor 232 to operate. Contact M recloses, but the vertical apron motor does not start at this time since contact N is still open. When contact 74 closes the reset solenoid 268 is energized, pulling in the cam follower 258 against the heart-shaped reset cam 248, causing the slider 250 of the correcting potentiometer 268 to be reset to its no-voltage position. It should be noted that the control potentiometer 242 is not disturbed by this resetting, and thus remains set at the value of the correction on the first load.

The time delay TD is so chosen that the weigh pan tripping cycle is completed before the contact of the time delay opens. As the tripping cycle is completed, contact 74 opens thereby de-energizing the reset solenoid 268 and contact 72 re-closes.

The contact of relay TD now is open to de-energize the relay $R_1$. This permits the contacts C, D, E, F and N to change back to the position shown in Figure 9. It should be noted that contact 230 is now closed and contact 228 is open since the weigh pan 24 is empty at this time. The voltage output of the control potentiometer 242 is now applied to the balance magnet coil circuit. The polarity of this voltage is now reversed, so that the resulting force on the end of the weigh arm 108 is now upward. This force has the same effect on the scale system as though a weight equal to the weight of the overrun on the first load had been placed in the weigh pan. The vertical apron 26 was started at the time the relay $R_1$ was de-energized, due to the closure of contact N, thus delivering more stock to the weigh pan 24.

The weighing cycle now repeats, but this time the contact 228 closes and shuts off the vertical apron 26 at the time the weight of the stock in the weigh pan 24 plus the weight of the previous overrun equal the scale setting. The stock which is falling at the time contact 228 closed again adds to the stock in the weigh pan 24. This overrun should be approximately the same as the previous overrun.

If the overrun of the second load is the same as that of the first load no further correction will be made, since the weigh arm 108 will balance, and both contacts 228 and 230 will be open when the relay $R_1$ is energized connecting the balance coil circuit to the correcting potentiometer 252, which at this time is in its no-load voltage position. If, however, the overrun of the second load is greater than that of the first load contact 228 will remain closed when contacts E and F of the relay $R_1$ are operated, and the setting motor 232 will again run in a direction such as to move both sliders 240, 250 to the left, until the scale system is balanced and contacts 228, 230 remain open. It will be seen that this small correction was added to the previous large correction on the control potentiometer 240. Conversely, if the overrun of the second load had been less than the first, contact 230 would have been closed when the relay $R_1$ operated, causing both sliders 240, 250, to move to the right until sufficient upward force was supplied to the weigh arm 108. In order to open contact 230 the correction was thus subtracted from the previous large correction on the control potentiometer 242.

The system operates continuously in this manner, correcting each weigh pan load by the amount that the previous load was in error. This maintains a constant rate of delivery to the conveyor regardless of the rate of delivery of stock to the weigh pan from the vertical apron.

In Figure 10 a schematic diagram of one method for controlling the pusher board 92 to compensate for the individual weight variations of the loads of stock dropped from the conveyor 26 to the weigh pan 60 is shown. The control circuit for this mechanism is shown in the broken lines appearing in Figure 9 of the drawings. The device consists of a worm wheel 310 which is rotatably mounted on the conventional bell crank lever pivot pin 104. This worm wheel carries a stop pin 312 which is contacted by the bell crank lever 102 after pusher board 92 advances due to the rotation of the drive crank 314 driven on shaft 315 by actuation of drive gear 317. A reset spring 316 is attached to the opposite side of the worm wheel 310 so that the worm wheel will return to the position shown if the worm 318 is disengaged from the wheel 310. The worm 318 is driven by a reversing type synchronous motor (pusher board stop motor) 320 provided with reversing windings 322, 324 and which is connected electrically to the weight control mechanism disclosed in Figure 9 in parallel with the setting motor 232. A pusher board reset solenoid 326 is provided, which disengages the worm 318 from the worm wheel 310 when energized. This is accomplished by mounting motor 320 on lever arm 325 which is pivoted at 328 on a suitable base while the end 330 is engaged by the armature bar 332 of the reset solenoid 326. A worm engaging spring 334 re-engages the worm 318 and the worm wheel 310 when the solenoid 326 is not energized. A pusher board spring 336 is provided on the drive rod 338 which allows rotation of the bell crank 102 to stop when it contacts the stop pin 312 while the worm 318 is engaged with the worm wheel 310. When the bell crank 102 stops against the stop pin 312, the drive rod 338 slides through the bushing 340 and the pusher board spring 336 compresses against lug 342 while the drive rod 338 completes its stroke.

The pusher board reset solenoid 326 is connected electrically as shown in broken lines in Figure 9. It will be seen that this solenoid is energized at the time the contact 228 closes, energizing the relay R₂. The solenoid circuit is from S₁ through the contacts 72, N, and M to S₂. It will also be seen that the pusher board reset solenoid 326 is released at the time the relay R₁ operates to open contact N, so that the solenoid 326 is only energized during the pull-in delay of the time delay relay TD.

In operation, stock feeds into the weigh pan 60, as previously described until contact 228 closes, thereby stopping the movement of the vertical apron 26. This also energizes the pusher board reset solenoid 326, allowing the reset spring 316 to return the worm wheel 310 to its neutral position as shown. The solenoid 326 is then de-energized allowing the worm 318 to re-engage the wheel 310.

If the weight of the stock in the weigh pan is exactly correct, neither contact 228 nor 230 will close during the correcting time, and neither the setting motor 232 nor the pusher board stop motor 320 will operate. However, if the weight of the stock in the weigh pan was too heavy, contact 228 will close causing the setting motor 232 to run as previously described, and also causes the pusher board stop motor 320 to rotate the worm wheel 310 in a clockwise direction. The amount of this rotation is proportional to the error in weight of the load of stock, since both of the motors are synchronous. Since the worm wheel 310 was rotated clockwise from its neutral position, the angle through which the bell crank 102 moves before being stopped by the stop pin 312 is decreased. Hence, the pusher board 92 does not move forward as far as it otherwise would have had no correction been made. The density to which the pile of stock is compressed by the advance of the pusher board 92 can thus be maintained constantly, regardless of individual weight variations.

Had the weight of stock been light in the weigh pan 60, the direction of the worm wheel 310 would have been counterclockwise, allowing the pusher board 92 to advance further than its normal distance, thus maintaining a constant density of stock on the conveyor.

On certain applications of the weight control mechanism, it is desirable to provide an indicating means and a protective device which will shut down the entire machine in the event that the weight of one of the weighings is in error by a large amount. This can be accomplished with the weight control mechanism by the methods described below.

One of such methods comprises a voltage sensitive relay R₃ (Figure 9) which is connected across the output leads of the correcting potentiometer 252, by means of lead 346 as shown in Figure 9, so that if any one correction voltage is in excess of a predetermined amount, the relay contacts will close and actuate a signal and/or stop the entire machine through the switch 390, completing the circuit to the relay through line 346.

A second method for actuating relay R₃ would be by attaching two contacts K and L to the correcting potentiometer 252 as shown. These contacts would be adjustable so that the angle through which the slider 250 must move to close either contact could be preset. In this case the electrical circuit would be completed through line 344 instead of 346 as in the former example. The relay R₃ would be actuated if either contact K or L were contacted by the slider 250.

A second protective device may also be provided to indicate when the amount of stock in the hopper is so low that the weigh pan 24 does not receive sufficient weight of stock before the trip mechanism operates. It will be seen that if this occurs, contact 74 will close while the contacts of relay R₁ are still in the position shown in Figure 9. Also contact 230 will remain closed since the weigh pan has not yet received its full load. If this happens, relay R₄ will be energized through a path from S₁ through contacts 230, D and 74 to contact S₂. The normally closed contact of the relay R₄ would be in the hold-in circuit of the main motor starter of the entire machine, so that a momentary opening of this contact would stop the entire machine.

Alternate means for operating the control mechanism are shown in Figures 11 to 19 inclusive. The first of these comprises the method illustrated in Figure 11 which is largely self-explanatory. In this figure, the weigh arm 108 has secured to one end thereof the switch lever arm 348 which alternately opens and closes the switch points 228, 230 depending upon whether or not the load delivered to the weigh pan is over or under weight, or is being corrected for either of these. The operation of the mechanism remains the same.

In Figure 12 the weigh arm 108 is shown as being kinematically connected with the fulcrum lever 350 by means of connecting bar 352, the bar 350 being pivoted on a suitable base 354. The bar has secured thereon a pair of oppositely disposed magnets 356 and 358. Disposed on opposite sides of the opposed magnets are a pair of commercial magnetic mercury switches 360 and 362, the switches comprising the equivalent of the switch mechanism 220, 228 and 230 of Figure 6. Movement of the magnets in response to movement of the weigh arm actuates the switches by magnetic attraction from the outside of the sealed glass tube.

In Figure 13, the weigh arm 108 is connected with a pair of oppositely disposed spring members 364, 366, the free ends 368 and 370 of which engage against a piezoelectric crystal 372. Upon actuation by the weigh arm 108 the piezoelectric crystal generates a voltage responsive to the pressure of the spring arms 368, 370 which is delievered to lead lines 374, 376 connected with suitable amplifiers (not shown).

Figure 14:
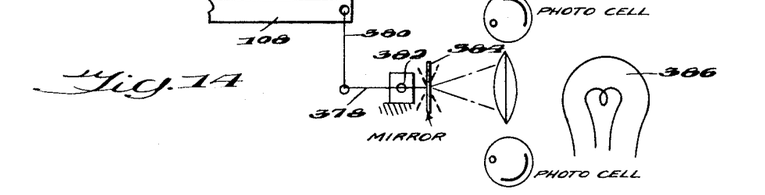
Figure 14 is still another method for indicating to the control mechanism the position of the weigh arm.

Figure 14 discloses a system wherein the weigh arm 108 is again kinematically connected with the lever 378 through rod 380, the lever 378 being pivoted at 382 and carries on its free end section a mirror 384 which is adapted to be moved to a plurality of positions. A source of light 386 is provided and focused through lens 388 for reflection against the mirror 384. So long as weigh arm remains in its neutral position, the mirror remains substantially vertical. However, if the weight of the material delivered to the weight pan is either over or under the predetermined established norm, the mirror 384 will be tilted to reflect the rays from the light source 386 to either of the photoelectric cells 392 or 394. The photo cells are connected with the circuit shown in Figure 9 through suitable amplifiers (not shown).

Figure 15:
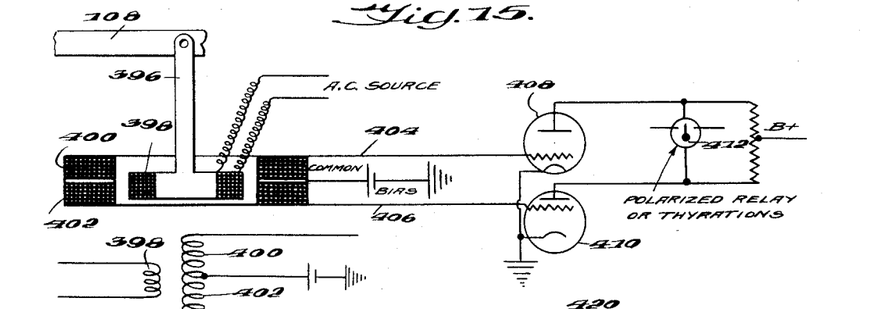
Figure 15 is a schematic illustration of a still further method for indicating to the control mechanism the position of the weigh arm.

Still another modification is shown in Figure 15. In this embodiment the weigh arm 108 is connected by means of the pivoted arm 396 to an induction coil 398. The coil 398 is substantially circular in configuration and is inclosed by a pair of superposed coils 400 and 402. The coil 398 is energized by connection with an exterior source of alternating current, and coils 400 and 402 are connected through leads 404, 406 to a pair of triode tubes 408, 410. Actuation of the coil 398 through the fields of the coils 400, 402 will induce a current in lines 404, 406 which is responsive to the position of the weigh arm 108. This current is transmitted to the polarized relay 412.

Figures 16, 17:
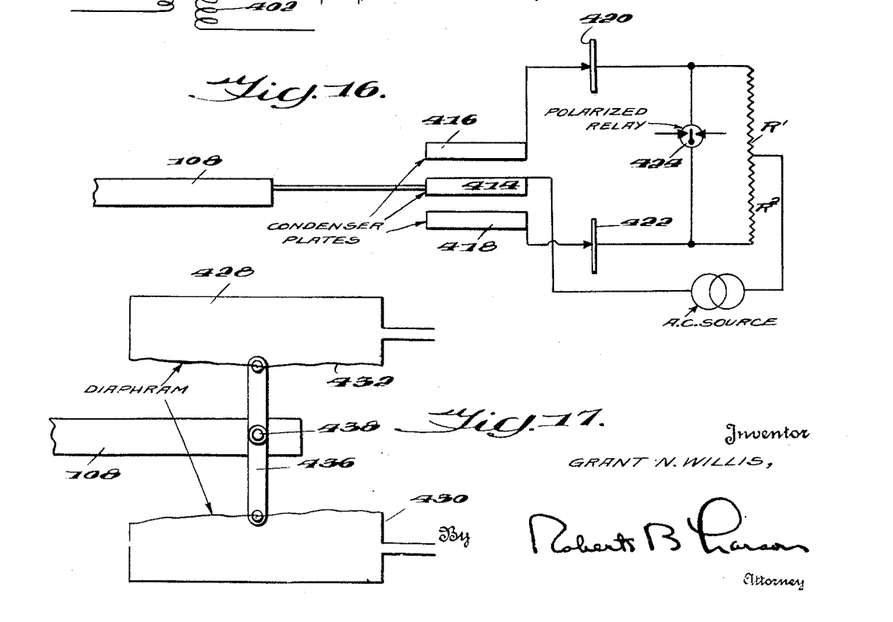
Figure 16 is another diagrammatic illustration of a method for indicating to the control mechanism the position of the weigh arm.
Figure 17 is a schematic representation of still another method for indicating to the control mechanism the position of the weigh arm.

In Figure 16 is schematically illustrated another method for indicating the position of the weigh arm 108. In this modification movement of the weigh arm 108 changes the position of the condenser plate 414 with respect to two oppositely disposed fixed condenser plates 416 and 418 causes a change in the capacitance which is detected through the circuit shown, comprising a pair of selenium rectifiers 420, 422, which are connected with a polarized relay 424. The circuit is energized from a source of alternating current 426 through the resistance $R_1$, $R_2$ wherein $R_1$ is equal to $R_2$.

In Figure 17 a pneumatic or hydraulic system is schematically illustrated. In this figure the reference numerals 428 and 430 indicate a pair of chambers having flexible diaphragms 432 and 434 which are interconnected by means of the bar 436. The weigh arm 108 has one of its ends pivotally connected to the bar 436 by means of the pivot pin 438. It becomes obvious that movement of the weigh arm in one direction or the other will cause increased or decreased pressure to obtain in either chamber 428 or 430. The amount of pressure necessary to bring the weigh arm into balance would be "remembered" in this control mechanism by utilizing an automatically adjustable pressure regulator (not shown) adapted to seek the balance point. The magnitude of the pressure generated in either of the two chambers would be added to or subtracted from the control pressure which had been originally set up in chamber 430 during the weighing operation. It is obvious this system could also utilize a vacuum as well as the pressure means shown.

Figures 18, 19:
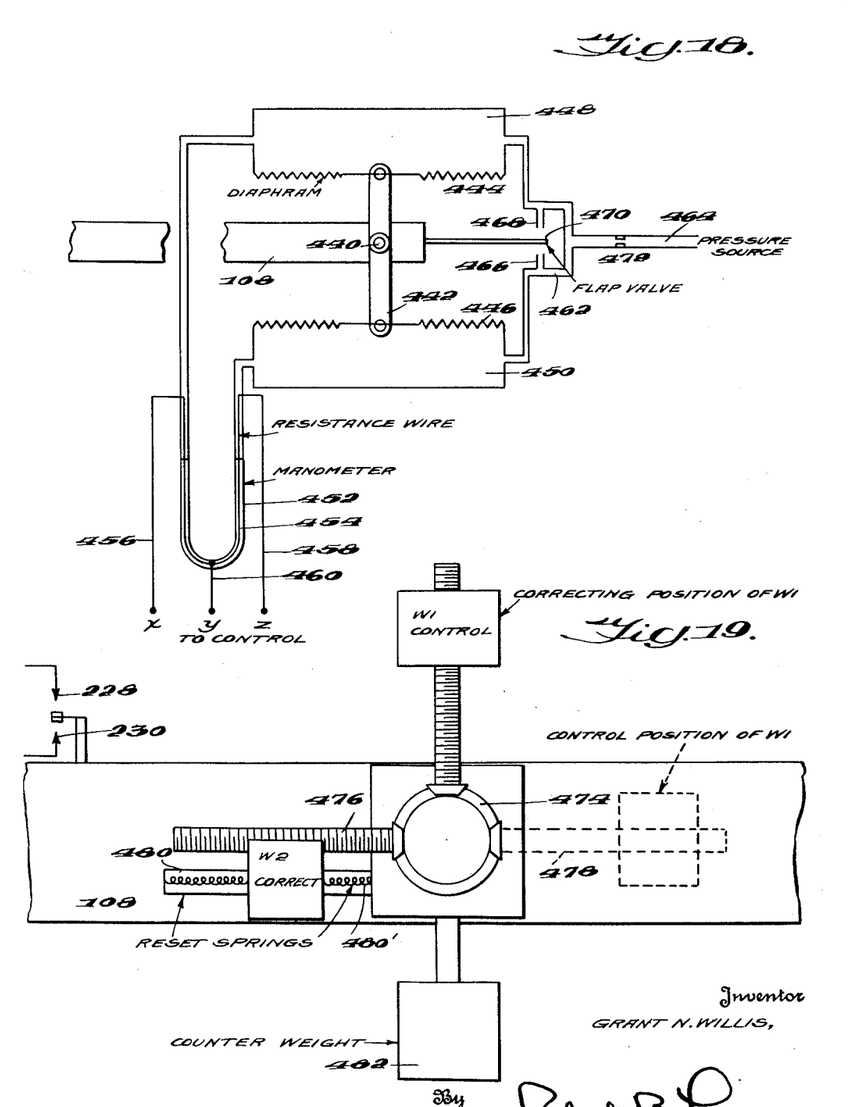
Figure 18 is another alternative method for indicating to the control mechanism the position of the weigh arm.
Figure 19 is a still further alternative modification of a method for indicating to the control mechanism the position of the weigh arm.

In Figure 18 the system shown in Figure 17 has been elaborated, the weigh arm 108 being connected, pivotally, at 440 to a cross bar 442 the ends of which are in turn connected with the opposed diaphragms 444 and 446 of the chambers 448 and 450. The two chambers are interconnected by means of a manometer 452 in which is disposed a resistance wire 454 having leads 456 and 458. The manometer is tapped for a center point and the lead 460 is taken therefrom. The chambers 448 and 450 are also interconnected by means of the conduit 462 which is connected through the conduit 464 with a source of pressure. The conduit 462 is also provided with the branch conduits 466, 468 under the control of a flap valve 470 (shown diagrammatically) which is connected with one end of the weigh arm 108.

In operation, let it be assumed that the load delivered to the weigh pan is too heavy or too light. Under such conditions the flap valve 470 will close one or the other of the openings of the branch conduits 466, 468. If now a gradually increasing pressure has been introduced through the orifice 472, the pressure in chamber 448 (if the load has been too heavy) will increase until the flap valve 470 opens. The pressure in chamber 450 would not have been increased during this time because the flap valve seat 466 has been maintained in open position. The pressure differential across the two chambers 448 and 450 is, of course, measured by the manometer 452. This gives an index as to the required amount of force. A convenient way of recording this differential pressure comprises the resistance wire 454 which is disposed in the manometer fluid consisting of an electrolyte of any desired type. As the manometer fluid moves, the resistance between points Y and X and Y and Z will vary according to the pressure differential. The control mechanism therefore could use a simple resistance measuring circuit (not shown) to detect the amount of pressure differential needed for each weighing, and also to control the control pressure.

In Figure 19 another possible control method is illustrated. In this embodiment the entire assembly is carried on the weigh arm 108. A reversible motor (not shown) is utilized to turn the bevel gear 474. The reversible motor is operated by contacts 228 and 230 during the correcting cycle. Rotation of the motor drives the screws 476 and 478 to shift the half nut weight $W_2$ longitudinally on the weigh arm 108, and also will move the weight $W_1$ a corresponding distance up or down. When the correction is accomplished, the arm stabilizes at the neutral position with both contacts 228 and 230 open. At the start of the next weighing cycle, the gear housing is rotated clockwise 90 degrees so that the weight $W_1$ is in the control position and the weight $W_2$ is returned to its neutral position by means of reset spring 480, 480'. When the next load of stock is received by the weigh pan, the feed is again cut off, the gear housing is rotated back to the position shown, and the correcting cycle repeats. The counterweight 482 is used to balance the weight of weight $W_1$ in its neutral position.

Having described my invention in detail it is to be understood that the various embodiments disclosed and illustrated herein are given merely by way of example and that this invention is to be limited only by the scope of the following claims.

I claim:

1. In an automatic weighing machine for maintaining a predetermined average weight for a plurality of quantities of material weighed by a plurality of successive weighing operations, the combination of material receiving means, a fulcrumed balance arm supporting said material receiving means, means for feeding material to said material receiving means, means connected to said balance arm and operated by unbalance of said arm at the end of a first weighing operation for applying to said arm during the next weighing operation a bias which unbalances the arm in a direction opposite to, and by an amount equal to the unbalance existing at the end of said first weighing operation, and means under the control of said arm for terminating operation of said feeding means during each weighing operation when the weight of material fed to said material receiving means moves said arm to a predetermined position.

2. In an automatic weighing machine, the combination as set forth in claim 1, said unbalance operated means including fluid pressure means for indicating the condition of said balance arm at the termination of each weighing operation, and fluid pressure means for exerting an appropriate compensating bias on said balance arm during the next succeeding weighing operation to maintain said predetermined average weight for said plurality of quantities.

3. In an automatic weighing machine, the combination as set forth in claim 1, said unbalance operated means including electrical means including a light source and photoelectric cell arrangement for measuring any variation in the weight of each quantity of material with respect to said predetermined value, and electrical means for applying a compensating bias to the balance arm during the next following weighing operation in accordance with the measured variation of the previous quantity.

4. In an automatic weighing machine for maintaining a predetermined average weight for a plurality of quantities of material weighed by a plurality of successive weighing operations, the combination of material receiving means, means for supplying successive quantities of material to said receiving means, means for periodically emptying said material receiving means, a fulcrumed balance arm supporting said material receiving means, counterbalance means exerting a force on said balance arm in opposition to said receiving means and its contents, a voltage source, electromagnetic means for influencing said balance arm, a first potentiometer connected to said voltage source and to said electromagnetic means, means for rotating said first potentiometer during each weighing operation from a zero voltage output position by an amount corresponding to the degree of unbalance of said arm at the termination of the weighing operation to a position supplying bias voltage to said electromagnetic means for influencing the balance arm to a predetermined condition of balance, said bias voltage being a measure of the deviation of the weight of the quantity being weighed from said average weight, a second potentiometer adapted to be driven by movement of said first potentiometer and connected to said electromagnetic means to apply thereto a bias voltage for influencing the balance arm during the next following weighing operation to compensate for said deviation, and means controlled by said balance arm for terminating operation of said supplying means when the weight of material in said receiving means moves said balance arm to a predetermined position.

5. In an automatic weighing machine, the combination set forth in claim 1, said unbalance operated means including electrical means having a characteristic which is variable in value in accordance with the state of unbalance of the arm at the end of each weighing operation, and also including electrically operated means connected to said electrical means and arranged to transmit said bias to said arm in an amount corresponding to the value of said characteristic at the termination of said first weighing operation.

6. In an automatic weighing machine, the combination set forth in claim 5, in which said electrically operated means comprised electromagnetic means.

7. In an automatic weighing machine, the combination set forth in claim 1, said unbalance operated means including electrical means having a characteristic which is variable in value in accordance with the state of unbalance of the arm at the end of each weighing operation, and also including electrically operated means connected to said electrical means and arranged to transmit said bias to said arm in an amount corresponding to the value of said characteristic at the termination of said first weighing operation, and dash pot means connected to said arm for smoothing out operation of the arm.

8. In an automatic weighing machine for maintaining a predetermined average weight for a plurality of quantities of material weighed by a plurality of successive weighing operations, the combination of material receiving means, balance weighing means supporting said material receiving means, means for feeding material to said material receiving means, balance control means operated by the unbalance of said weighing means to sense the amount of unbalance existing at the end of said first weighing operation, means for applying to said weighing means during the next operation a bias which unbalances said weighing means in a direction opposite to and by an amount equal to the amount sensed by said balance control means, and means under the control of said weighing means for terminating operation of said feeding means during each weighing operation when the weight of material fed to said material receiving means moves said weighing means to a predetermined position.

9. In an automatic weighing machine for maintaining a predetermined average weight for a plurality of quantities of material weighed by a plurality of successive weighing operations, the combination of material receiving means, a fulcrumed balance arm supporting said material receiving means, means for feeding material to said material receiving means, balance control means operated by the unbalance of said arm to sense the amount of unbalance existing at the end of said first weighing operation, means for applying to said arm during the next operation a bias which unbalances the arm in a direction opposite to and by an amount equal to the amount sensed by said balance control means, and means under the control of said arm for terminating operation of said feeding means during each weighing operation when the weight of material fed to said material receiving means moves said arm to a predetermined position.

GRANT N. WILLIS.

REFERENCES CITED

The following references are of record in the file of this patent:

UNITED STATES PATENTS

| Number | Name | Date |
|---|---|---|
| 928,658 | Hoyt | July 20, 1909 |
| 1,055,391 | Fisher | Mar. 11, 1913 |
| 2,050,496 | Mayo | Aug. 11, 1936 |
| 2,076,617 | Cleaves | Apr. 13, 1937 |